United States Patent [19]

Alexander, III

[11] Patent Number: 5,061,300
[45] Date of Patent: Oct. 29, 1991

[54] COALESCER FILTER AND METHOD

[76] Inventor: William J. Alexander, III, P.O. Box 848, Mauldin, S.C. 29662

[21] Appl. No.: 541,070

[22] Filed: Jun. 20, 1990

[51] Int. Cl.⁵ .............................................. B01D 53/26
[52] U.S. Cl. ........................................... 55/30; 55/35; 55/97; 55/316; 55/387
[58] Field of Search .................... 55/323, 316, 387, 30, 55/35, 97, DIG. 17

[56] References Cited

U.S. PATENT DOCUMENTS

| | | | |
|---|---|---|---|
| Re. 32,989 | 7/1989 | Mann | 55/323 |
| 1,458,005 | 6/1923 | Rohrer | 55/319 |
| 3,130,741 | 4/1964 | Vetere | 55/DIG. 17 |
| 3,705,480 | 12/1972 | Wireman | 55/DIG. 17 |
| 4,131,442 | 12/1978 | Frantz | 55/316 X |
| 4,572,725 | 2/1986 | Kojima | 55/316 X |
| 4,801,313 | 1/1989 | Mann | 55/179 |
| 4,822,387 | 4/1989 | Daniels | 55/323 |

Primary Examiner—Richard L. Chiesa
Attorney, Agent, or Firm—Bailey & Hardaway

[57] ABSTRACT

A coalescer filter is illustrated for removing material from a gas wherein a collection of liquid coalesced by passing a gaseous stream upwardly within a coalescing material packed in an upright cylindrical housing is facilitated by creating a pressure drop in a tube by venturi action and communicating the pressure drop to a canister. The use of a float valve is also illustrated for controlling the discharge of liquid collected in a sealed drainage canister receiving coalesced liquid from a lower portion of an upright column or housing containing coalescing material through which a gaseous stream is passed upwardly.

10 Claims, 2 Drawing Sheets

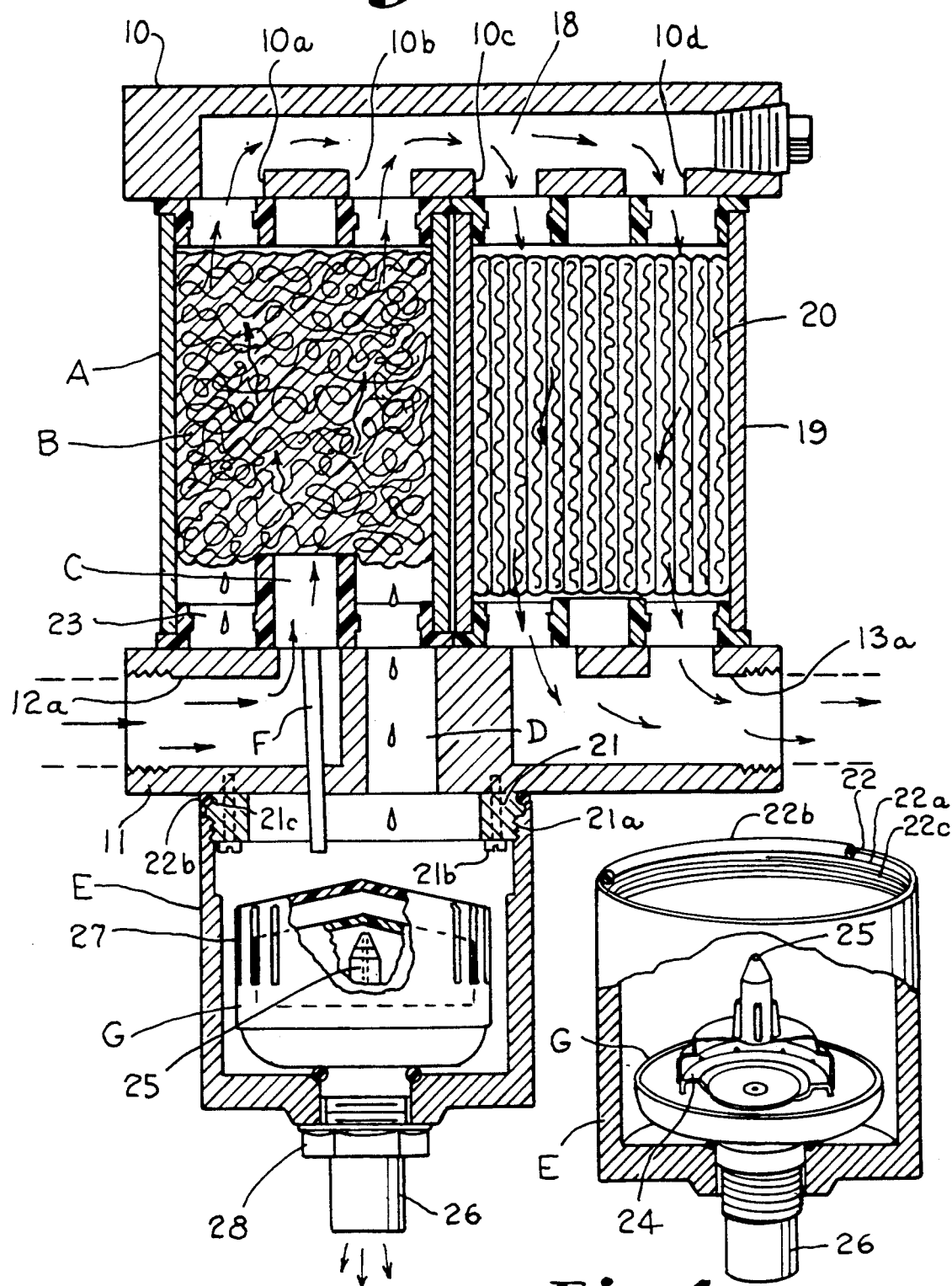

5,061,300

COALESCER FILTER AND METHOD

BACKGROUND OF THE INVENTION

This invention relates to a coalescer filter and method for the removal of liquid from air and other gases.

A filter and method is illustrated in U.S. Pat. No. 4,801,313 and in continuation application Ser. No. 07/265,895 filed Nov. 2, 1988, now abandoned wherein a gaseous stream is directed from an orifice of lesser diameter upwardly directly into a column packed with coalescing material. Other patents of interest include U.S. Pat. No. 1,458,005, which discloses a vertical expansion chamber containing no coalescing material but through which an upward flow is created and passes through a foraminous partition into an absorbent material. Of further interest is U.S. Pat. No. Re. 32,989, wherein a downward gaseous flow is first initiated in a vertical column containing a coalescing material from whence the gaseous flow is carried laterally and upwardly into a column containing absorbent material. U.S. Pat. No. 4,822,387 illustrates the use of a cartridge containing coalescing material through which an upward air flow is carried although there is no air stream since the air flow occurs upwardly through the entire cross section of the cartridge. A float valve is positioned in a lower end of an envelope containing the cartridge at an upper end.

An air or gaseous stream as contemplated herein occupies at least initially a cross section less than the cross section of the column containing coalescing material. The stream is centrally disposed in that a substantial portion is intermediate or away from the inner wall of the column, as originating from the inlet orifice illustrated herein, to permit coalescence of liquid with downward flow thereof by gravity opposite the direction of the stream.

Accordingly, it is an important object of the present invention to facilitate the collection and discharge of coalesced liquid from the coalescing column of the filter.

Another object of the invention is the positive expulsion of the coalesced liquid from the collection canister to avoid the necessity of providing air flow to cause drainage as heretofore.

Another important object of the invention is to provide a collection canister for the coalesced liquid with an effective and efficient means of discharge as well as ease of servicing and effective mounting and sealing.

Another important object of the invention is to prevent large and expensive air loss, on a continuous basis, in the discharge of coalesced and collected liquids.

Another object of the invention is to prevent large pressure drops across the unit normally associated with the discharge of coalesced liquids.

SUMMARY OF THE INVENTION

It has been found that collection of liquid in a drainage container or canister from an upright housing into which coalescing material is packed and through which a gaseous stream is generated flowing in an intermediate or central portion of the housing containing the coalescing material is facilitated by positioning a tube having one end disposed in an inlet for the gaseous stream into the housing while the other end is positioned within the drainage container creating a negative pressure gradient which serves as an additive force to that of gravity complementing same for removal of coalesced material and solids.

It has been further found that drainage from the drainage container can be facilitated by positioning a float valve therein. Preferably the valve is to be of the pneumatically powered hydraulically differentially operated kind which is completely automatic for positive ejection of the liquids coalesced from the interior of the canister to atmosphere or a piped away drain via a threaded opening at the lower extremity of the automatic drain.

The air tube in the air stream allows the liquid to drain into a canister that is sealed except when draining liquid in response to the action of the float valve. No air seepage from the canister is required in order to discharge liquid therefrom. Heretofore, as in the structure of U.S. Pat. No. 4,801,313, an excessive quantity of air must flow with the coalesced liquids to assure the discharge of said coalesced liquids form the collection area, due to a requirement for a constant discharge of air, whether or not any coalesced liquids are present.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a sectional elevation taken on the line 3—3 in FIG. 1 illustrating a coalescer filter and method in accordance with the invention illustrating an air tube connecting the inlet flow of air or other gas into the coalescing material with a discharge container or canister positioned thereneath for collecting the liquid coalesced material, together with a float valve in the canister, for controlling liquid flow from the canister; and FIG. 4 is a perspective view, with parts broken away, further illustrating the canister and valve constructed in accordance with the invention.

DESCRIPTION OF A PREFERRED EMBODIMENT

A coalescer air filter has an upright cylindrical housing or column A containing suitable coalescing material B. An air inlet C is provided through which an unfiltered air flow enters a central lower portion of the upright housing and is directed upwardly as an air stream into the coalescing material. A drainage opening D is positioned laterally of the air inlet receiving liquid, and any solids contained therein, coalesced in the housing. A drainage container E is carried below the air inlet for collecting liquid from the drainage opening. An air tube F extends upwardly from the drainage container into the air flow whereby a differential pressure gradient in the air tube caused by the air flow facilitates a flow of liquid into the drainage container by reducing air pressure in said drainage container or canister. A float valve or automatic filter drain G is carried in the canister for controlling discharge of liquid therefrom, preferably by positive ejection of coalesced material.

Figure 1:
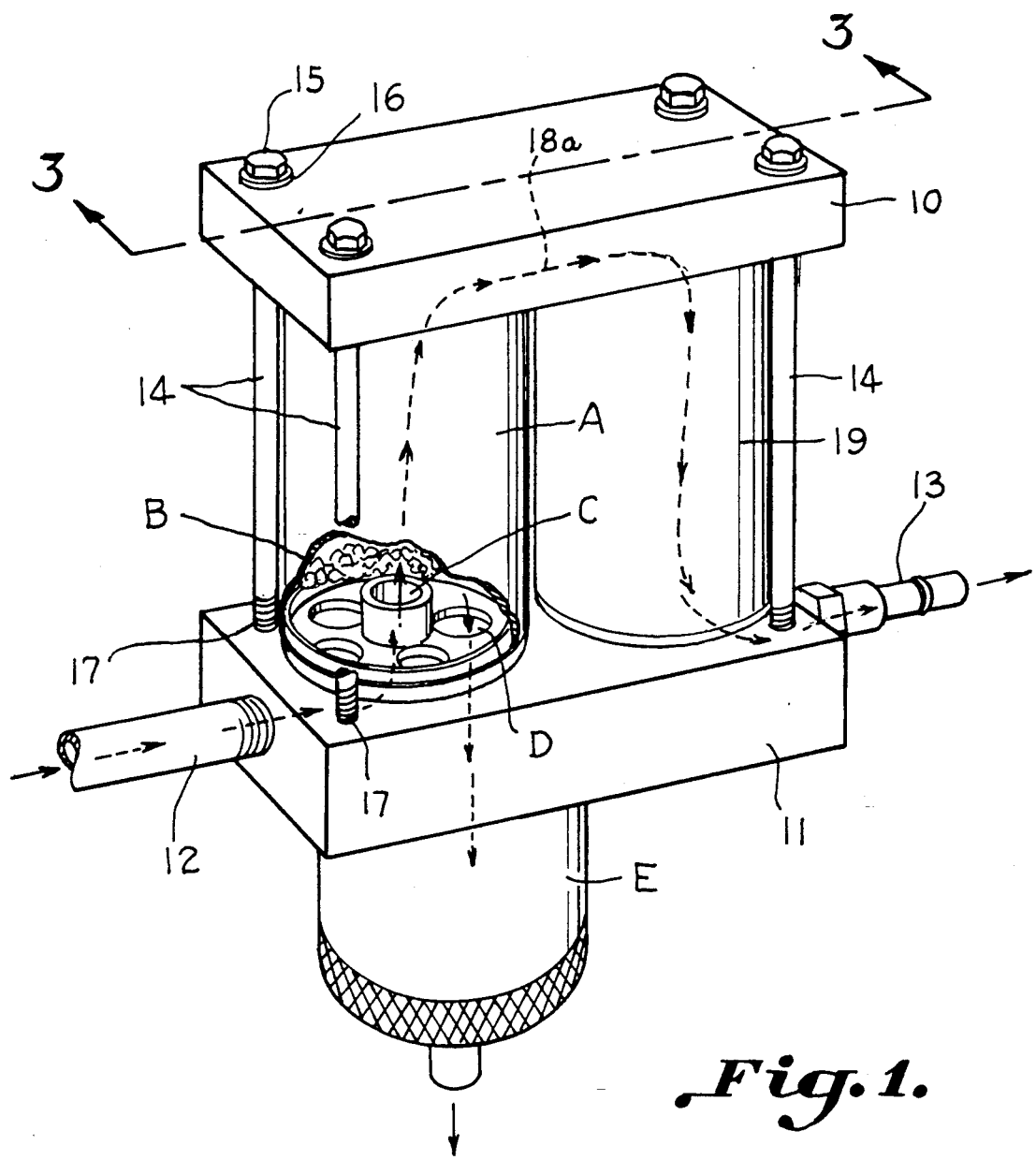
FIG. 1 is a perspective view illustrating a coalescer filter and method of operation in accordance with the invention wherein a canister is positioned below a drainage opening in an upright coalescer housing.
Figure 2:
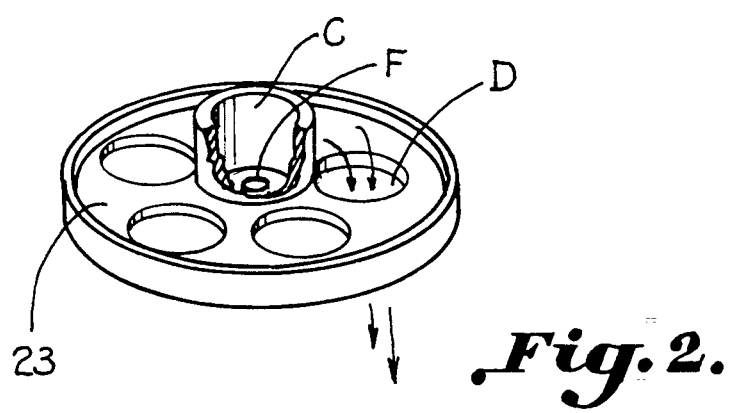
FIG. 2 is an enlarged perspective view illustrating the collecting area for liquid coalesced in said coalescer housing.

FIGS. 1 and 3 illustrate the positioning of an upright cylindrical housing or column A containing coalescing material B between an upper support 10 and a lower or base support 11. The base support has an inlet connection 12 for gas on one end and an outlet line 13 for the filtered air or gas on the other end of the base 11. The upper support 10 and the base 11 are connected as by elongated bolts 14 which are provided with heads 15 and washers 16 on one end and which are threaded as at 17 on the other end into the base 11. Air is introduced through an orifice of lesser cross section than said coalescer so as to be a stream flowing into the column A through the orifice C. Moisture or liquid collected as a result of coalescence is collected and passes through the drainage opening D. The upper support 10 has a horizontal passageway 18 (FIG. 3) through which an air flow 18a passes from an upper end of the housing A.

The flow 18a passes downwardly through an upright housing or column 19 which contains a suitable filter material 20 (FIG. 3) to the outlet 13.

A canister or drainage container E is carried beneath the inlet C and is received on threads 21a on a ring 21 suitably fixed to the base member 11 as by screws 21b. It is important to note that the canister E has a reduced lip 22 defining a recess 22a for positioning a compressible ring such as the O-ring 22b above the internal threads 22c and extending above the upper surface of the lip 22 to form a seal when compressed between the lip and the bottom of the base 11 and within a recess 21c in the ring 21. This provides an effective seal in order to prevent air leakage as might interfere with drainage.

The inlet connection 12 is threadably received within the bore 12a while the outlet 13 is threadably received in the bore 13a within the base 11. The air inlet C is provided in the form of a tubular orifice receiving inlet air or gas from the inlet connection 12 and directing same upwardly as a centrally disposed air stream which has a diameter less than that of the column A. This permits the air flow to directly impinge upon the fibrous metallic non-absorptive coalescing material which may be of the type known as "GOODLOE" which is well known to the prior art and described in U.S. Pat. Nos. Re. 32,989 and 4,801,313, although other preferably non-absorptive porous material suitable for promoting coalescence may be used. The coalesced material including liquid moves or flows downwardly along the wall of the column and is collected in the area 23 about the inlet orifice C.

By thus directing the gas from which material is to be coalesced upwardly in a stream within the coalescing material packed in the column, the stream expands and as a fountain and the coalesced material is separated and flows downwardly by gravity. Thus, coalescence takes place by directing the gaseous stream through the coalescing material upwardly against the force of gravity.

The expanded flow of the gaseous stream passes through the openings 10a and 10b and through the openings 10c and 10d into a downward flow extending across the filter column 19. The upward gaseous stream in the column A is centrally disposed or located in that it is preferably sufficiently spaced from the wall of the column A at least initially to permit coalescence with downward flow of separated material against the upward flow of the gaseous stream to permit upward coalescence with a downward flow of separated materials against the upwardflow of the gaseous stream.

The flow of coalesced liquid material through the drainage opening D is aided by producing a pressure differential between the upper opening D and the canister E into which the coalesced material flows. This is accomplished by the provision of a tube F which may be centrally disposed within the air stream flowing into the inlet orifice C on one end. This is illustrated as being accomplished within the bore or duct 12a within the base, but such may extend into the orifice C so long as a pressure differential is achieved. The important point is that one end of the tube is in a concentrated air flow or stream to create a pressure drop which is transferred to a canister for collecting the liquid coalesced material. The other end of the tube F is disposed in the canister E transferring the pressure differential therein.

Preferably the float valve G is used in combination with the tube F as described above. The float valve is preferably of the type schematically illustrated in FIGS. 3 and 4 and may be of a type supplied by Parker Hannifin Corporation, Otsego, Mich. 49078, and designated "automatic filter drain." The automatic filter drain G is positioned in the bottom of the canister E and includes a diaphragm 24 which is responsive to differential pressures created by the level of liquid in the canister across said diaphragm, ejecting liquids in the canister from same to air passage 25 permitting liquid to be drained through the threaded drain 26 which is threaded to accept, if required, a drain line, for the positively ejected liquids. The diaphragm 24 and the air passage 25 are contained in the housing 27 which is internally vented to the atmosphere and which is positioned by the nut 28 at the bottom of the canister.

In the absence of liquid the diaphragm 24 is seated closing the air passage 25. In view of the negative pressure gradient transferred by the tube F to the canister, flow of the coalesced liquid materials through the passage D to the canister is increased. The discharge is positively accomplished by means of the automatic filter drain positioned at the bottom of the canister E.

Thus, the collection of the coalesced liquid with solid impurities is facilitated by the provision of the canister which receives the liquid from the drainage passage D. In view of the negative pressure gradient created by the tube F to the canister, flow of liquid through the passage D to the canister is increased. The discharge is positively accomplished by means of the automatic filter drain positioned in the bottom of the canister E. The particular float valve described and illustrated is especially efficient and is preferred, although any float valve which operates efficiently as an automatic drain responsive to liquid level may be utilized. Other drain valves such as automatic float drains, cycle drains, or, electrically or pneumatically timed drain valves may be employed.

While a preferred embodiment of the invention has been described using specific terms, such description is for illustrative purposes only, and it is to be understood that changes and variations may be made without departing from the spirit or scope of the following claims.

What is claimed is:

1. A coalescer filter for removing a liquid from a gas comprising:
   an upright housing;
   coalescing material packed in said housing;
   an inlet for gas through which an unfiltered gaseous stream enters a lower portion of said upright housing and is directed upwardly into said coalescing material;

a drainage opening positioned laterally of said inlet receiving liquid coalesced in said housing;

a canister below said inlet for collecting said liquid from said drainage opening; and a tube extending upwardly from said canister into said gaseous stream creating a pressure drop in said tube;

whereby a negative pressure gradient is created in said canister facilitating a flow of liquid into said canister.

2. The structure set forth in claim 1 including a drain in said canister for controlling discharge of liquid therefrom.

3. The structure set forth in claim 2 wherein said drain includes a float valve.

4. A coalescer air filter comprising:

an upright cylindrical housing containing coalescing material;

an air inlet through which an unfiltered air stream enters a central lower portion of said upright housing and is directed upwardly into said coalescing material;

a drainage opening positioned laterally of said air inlet receiving liquid coalesced in said housing;

a canister below said air inlet for collecting said liquid from said drainage opening; and an air tube extending upwardly from said canister into said air stream;

whereby a pressure drop in said air tube caused by said air flow facilitates a flow of liquid into said canister by reducing air pressure in said canister.

5. A coalescer air filter comprising:

an upright cylindrical housing containing coalescing material packed therein;

an air inlet through which an unfiltered air stream enters a lower portion of said upright housing and is directed upwardly into said coalescing material;

a drainage opening positioned laterally of said air inlet receiving liquid coalesced in said housing;

a canister for collecting said liquid from said drainage opening; and a tube extending from said canister into said air stream; and a float valve in said canister controlling the discharge of liquid collected in said canister;

whereby a pressure drop in said tube caused by said air stream facilitates a flow of liquid into said canister by reducing air pressure in said canister.

6. The structure set forth in claim 5 including an upright housing containing a filter carried in side by side relation with said first mentioned upright housing receiving air from an upper portion of said first mentioned housing for downward movement through said filter.

7. The method of removing liquids from an air stream comprising the steps of:

providing an upright cylindrical housing containing coalescing material;

forming an air stream in said cylindrical housing upwardly through said coalescing material;

causing said liquids contained within said air stream to coalesce and flow downwardly by gravity in a direction opposite to the upward flow of said gaseous stream; and causing a pressure drop in a canister receiving coalesced liquids by positioning a tube having one end in said canister and the other end in said air stream to create a pressure drop in said canister.

8. The method of removing liquids from air comprising the steps of:

forming an air stream;

providing an upright cylindrical housing containing coalescing material;

introducing air to said cylindrical housing through said coalescing material;

causing liquids contained within said air to coalesce and flow downwardly; and causing a pressure drop in a canister positioned below said housing receiving coalesced liquids by positioning a tube having one end in said canister and the other end in said air stream to create a pressure drop in said canister.

9. The method set forth in claim 8 including the step of utilizing a float drain in said canister to drain coalesced liquid therefrom.

10. The method set forth in claim 8 including the step of positively expelling coalesced contaminants from said canister utilizing an automatic filter drain in a bottom of said canister.

* * * * *